(12) United States Patent
Pakulski et al.

(10) Patent No.: US 7,968,500 B2
(45) Date of Patent: Jun. 28, 2011

(54) GAS HYDRATE PROTECTION WITH HEAT PRODUCING TWO-COMPONENT GAS HYDRATE INHIBITORS

(75) Inventors: Marek K Pakulski, The Woodlands, TX (US); Qi Qu, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 270 days.

(21) Appl. No.: 12/145,910

(22) Filed: Jun. 25, 2008

(65) Prior Publication Data

US 2009/0325823 A1    Dec. 31, 2009

(51) Int. Cl.
*C09K 8/52* (2006.01)
*C09K 8/584* (2006.01)
*E21B 37/06* (2006.01)

(52) U.S. Cl. .......................... 507/90; 507/246; 166/304

(58) Field of Classification Search ............ 507/90, 507/246; 166/304
See application file for complete search history.

(56) References Cited

U.S. PATENT DOCUMENTS

| | | | |
|---|---|---|---|
| 4,411,814 A * | 10/1983 | Burkhardt | .......... 516/180 |
| 5,420,370 A | 5/1995 | Sloan, Jr. | |
| 5,484,488 A | 1/1996 | Hart et al. | |
| 5,741,758 A | 4/1998 | Pakulski | |
| 5,880,319 A | 3/1999 | Sloan, Jr. | |
| 6,025,302 A | 2/2000 | Pakulski | |
| 6,331,508 B1 | 12/2001 | Pakulski | |
| 6,756,345 B2 | 6/2004 | Pakulski et al. | |
| 7,067,459 B2 | 6/2006 | Pakulski et al. | |

* cited by examiner

*Primary Examiner* — Timothy J. Kugel
*Assistant Examiner* — Aiqun Li
(74) *Attorney, Agent, or Firm* — John Wilson Jones; Jones & Smith, LLP

(57) ABSTRACT

Methods and compositions useful in inhibiting the formation, growth, and/or maintenance of gas hydrates in a fluid mixture. The gas hydrate inhibitors comprise polyetheramines and acids that are exothermically reacted in situ to produce polyetherammonium compounds.

20 Claims, 6 Drawing Sheets

GAS HYDRATE PROTECTION WITH HEAT PRODUCING TWO-COMPONENT GAS HYDRATE INHIBITORS

BACKGROUND OF THE INVENTION

1. Field of the Invention

The invention relates to use of gas hydrate inhibitors that inhibit the formation and growth of gas hydrates and also reduce the amount of any existing gas hydrates within a fluid system.

2. Description of the Related Art

Clathrate hydrates are crystalline compounds that occur when water forms a cage-like structure that physically resembles ice around guest molecules, particularly gaseous molecules. Clathrate hydrates, especially in the petroleum industry, are referred to as gas hydrates, gas hydrate crystals, or hydrates. For purposes of this application, these terms will be used interchangeably. In the petroleum industry, gas hydrates pose particular problems with respect to producing, transporting, and processing of hydrocarbons. Typical gas hydrates formed in petroleum (hydrocarbon) environments are composed of water and one or more guest molecules such as methane, ethane, propane, isobutane, normal butane, nitrogen, carbon dioxide, and hydrogen sulfite. It is also known that other guest molecules such as ethylene, nitrous oxide, acetylene, vinyl chloride, ethyl bromide, and oxygen can form clathrate hydrates.

When allowed to form and grow, gas hydrate crystals can become a nuisance at best and pose a serious problem at worst. Gas hydrates can block transmission lines and plug blowout preventers, jeopardize the foundations of deep water platforms and pipelines, collapse tubing and casing, and taint process heat exchangers and expanders. To overcome these problems, several thermodynamic measures are possible in principal: removing free water, maintaining an elevated temperature and/or reduced pressure, or adding freezing point depressants, e.g., antifreeze. As a practical matter, adding freezing point depressants has been most frequently applied. Lower alcohols and glycols such as methanol have been added to function as antifreeze. Besides being somewhat ineffective, a relatively large amount of inhibitors, such as methanol, have to be used to achieve acceptable reduction of gas hydrate formation. For example, typically, methanol is added in an amount of between 20% and 40% of the water volume of a given fluid mixture system. This amount may vary, however, depending on the composition, temperature, and pressure parameters of the fluid mixture system. Not only is this expensive, but it also poses an additional problem since the addition of such large amounts of antifreeze requires recovery prior to further processing of the fluid mixture.

In lieu of antifreeze, a crystal growth inhibitor can be used that inhibits the formation of gas-hydrate crystals and/or the agglomeration of gas hydrate crystallites to large crystalline masses sufficient to cause plugging. Surface active agents such as phosphonates, phosphate esters, phosphonic acids, salts and esters of phosphonic acids, inorganic polyphosphates, salts and esters of inorganic polyphosphates, polyacrylamides, and polyacrylates have been used. It is also known that poly-N-vinyl-2-pyrrolidone (PVP), which is a well-known water-soluble polymer, is effective, in relatively low concentrations, in interfering with the growth of gas-hydrate crystals. Other additives for inhibiting crystal growth and controlling the formation of gas hydrates in fluid mixtures such as those encountered in the hydrocarbon industry in the production, transportation, and processing of petroleum and natural gas fluids are described in various patents, such as U.S. Pat. No. 5,880,319. It has also been disclosed that certain polyglycol diamines (PEA) prevent blockage of gas transmission lines with gas hydrates. PEA is a common acronym used for polyetheramines or polyglycol amines. These amines have the following general structure: $H_2NCHRCH_2(OCH_2CHR)_nNH_2$ where $R=H$ or $CH_3$ and $n=2$ to 6.

However, compositions and methods known in the art are only partially effective in preventing the formation of gas hydrates. When applied to conditions that strongly favor hydrate formation, prior art compositions and methods lose their effectiveness, to the point that they are not a practical solution to the hydrate problem.

A need exists for effective gas hydrate inhibitors that can be used in lower concentrations and work effectively at lower concentrations and at temperatures several degrees below the hydrate formation point.

SUMMARY OF THE INVENTION

In view of the foregoing, methods and compositions for inhibiting the formation, growth, and/or maintenance of gas hydrates are provided as embodiments of the present invention. The methods and compositions of the present invention generate heat in situ, which prevents new gas hydrates from forming, prevents existing gas hydrates from growing, and/or at least partially dissolves existing gas hydrates.

In an embodiment of the present invention, a method of inhibiting the formation, growth, or maintenance of gas hydrates in a fluid mixture is provided. In this embodiment, a polyetheramine and an acid are combined with the fluid mixture. In an aspect, the polyetheramine has the following formula:

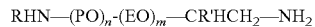
$$RHN-(PO)_n-(EO)_m-CR'HCH_2-NH_2$$

wherein PO=propylene oxide, n=0-10, EO=ethylene oxide, m=0-10, $R=H_2N-(PO)_n-(EO)_m-CH_2CH_2-$, and $R'=H$ or $CH_3$. In an aspect, the polyetheramine and the acid exothermically react so that a polyetherammonium compound is produced in situ that interferes with the formation, growth, and/or maintenance of gas hydrates in the fluid mixture. The temperature of the fluid mixture also increases as a result of the reaction between the polyetheramine and the acid.

As another embodiment of the present invention, another method of inhibiting the formation, growth, and/or maintenance of gas hydrates in a fluid mixture is provided. In this embodiment, a polyetheramine and an acid are mixed in the fluid mixture to produce a polyetherammonium compound in situ that interferes with the formation, growth, and/or maintenance of gas hydrates in the fluid mixture and increases a temperature in the fluid mixture. The resulting polyetherammonium compound has a formula as follows:

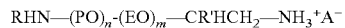
$$RHN-(PO)_n-(EO)_m-CR'HCH_2-NH_3^+A^-$$

wherein PO=propylene oxide, n=0-10, EO=ethylene oxide, m=0-10, $R=H_2N-(PO)_n-(EO)_m-CH_2CH_2-$, and $R'=H$ or $CH_3$, and $A=Cl$, $Br$, $I$, $SO_4$, $OH$, $R^2SO_3$, $R^2COO$, $HCOO$, or $CH_3COO$, wherein $R^2$=an organic radical.

Besides the method embodiments, well service compositions are also provided as embodiments of the present invention. In an aspect, the well service composition generates heat in situ as a result of the components reacting so that gas hydrates are prevented, reduced, and/or eliminated. The composition includes a fluid mixture that contains a gas hydrate inhibitor comprising a polyetheramine and an acid. As with other embodiments of the present invention, the polyetheramine has a formula as follows:

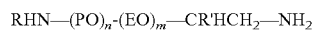
$$RHN-(PO)_n-(EO)_m-CR'HCH_2-NH_2$$

wherein PO=propylene oxide, n=0-10, EO=ethylene oxide, m=0-10, R=H$_2$N—(PO)$_n$-(EO)$_m$—CH$_2$CH$_2$—, and R'=H or CH$_3$. The polyetheramine and the acid exothermically react so that a polyetherammonium compound is produced in situ that interferes with the formation, growth, and/or maintenance of gas hydrates in the fluid mixture and results in an increase in temperature in the fluid mixture. In an aspect, the polyetheramine is present in an amount of about 0.1 wt. % to about 2 wt. % of the fluid mixture and the acid is present in an equimolar amount to the polyetheramine. In an aspect, the acid can be present in amounts above or below equimolar amounts.

Figure 1:
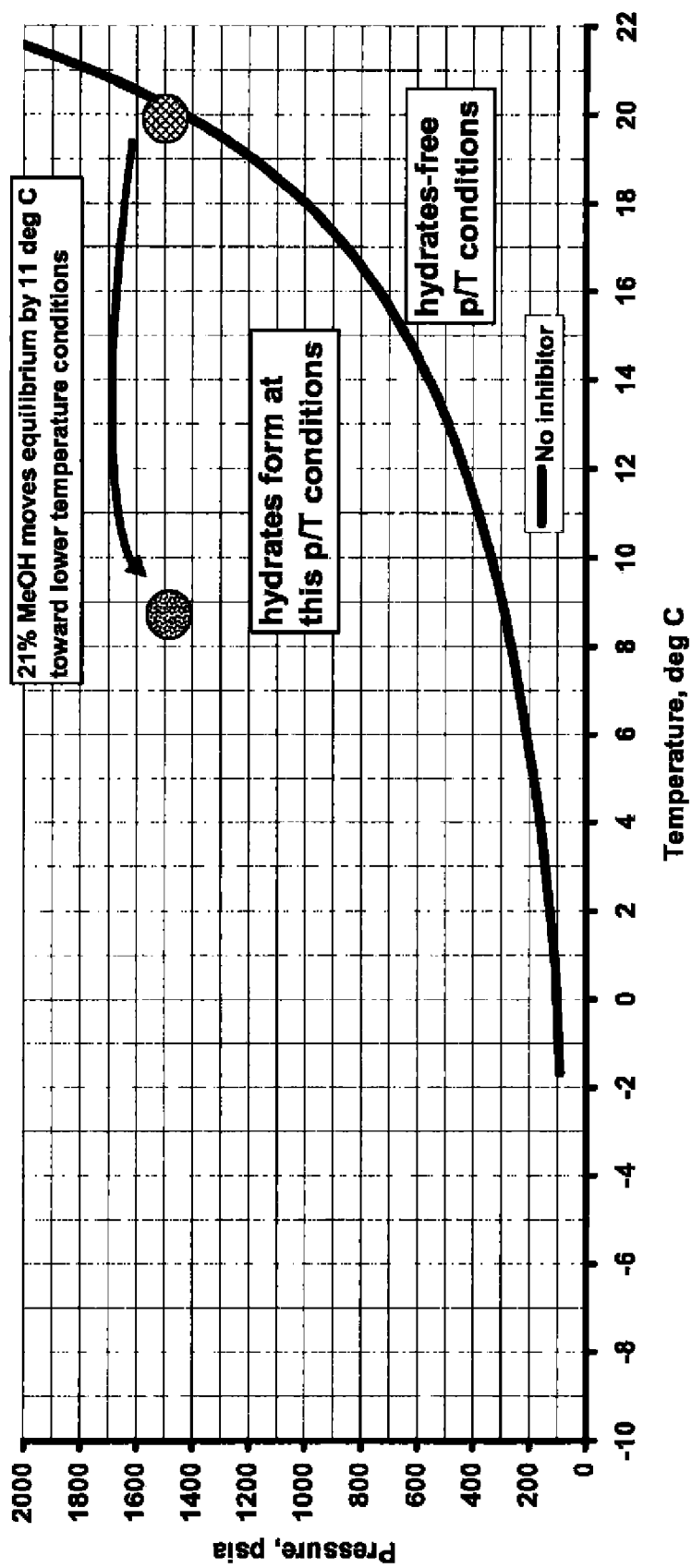
FIG. 1 is a chart illustrating the calculated effect to the hydrate equilibrium curve of adding methanol gas hydrate inhibitor to the water phase of a test gas in accordance with prior art methods and compositions resulting in a shift of the equilibrium toward lower temperatures.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

Illustrative embodiments of the invention are described below as they might be employed in the operation and in the treatment of well bores. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Methods and compositions for inhibiting the formation, growth, maintenance, or combinations thereof of gas hydrates are provided as embodiments of the present invention. The methods and compositions of the present invention generate heat in situ, which prevents new gas hydrates from forming, prevents existing gas hydrates from growing, and/or at least partially dissolves existing gas hydrates.

In an embodiment of the present invention, a method of inhibiting the formation, growth, maintenance, or combinations thereof of gas hydrates in a fluid mixture is provided. In this embodiment, a polyetheramine and an acid are combined with the fluid mixture. In an aspect, the polyetheramine has the following formula:

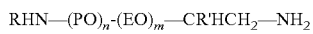

wherein PO=propylene oxide, n=0-10, EO=ethylene oxide, m=0-10, R=H$_2$N—(PO)$_n$-(EO)$_m$—CH$_2$CH$_2$—, and R'=H or CH$_3$. The polyetheramine and the acid exothermically react so that a polyetherammonium compound is produced in situ that interferes with the formation, growth, maintenance, or combinations thereof of gas hydrates in the fluid mixture. The temperature of the fluid mixture also increases as a result of the reaction between the polyetheramine and the acid.

In an aspect, the polyetheramine is present in an amount ranging from about 0.1 wt. % to about 2 wt. % of the fluid mixture, with the acid being present in an equimolar amount to the polyetheramine. For example, if 100 L of 2% solution of PEA (e.g., triethylene glycol diamines) having a molecular weight of 148 is neutralized, 2 kg or 13.5 moles of the amine can be used to optimize the system. The equimolar amount of acetic acid needed is 13.5 moles multiplied by the molecular weight of acetic acid (CH$_3$COOH)=13.5 moles×60 grams/mole=810 grams. More or less than an equimolar amount can be used, but the system will not be optimized. For example, if less acid is used, such as 10.8 moles (80%) of acid, the exothermic effect would be proportionally smaller. Only 80% of the amine would be quaternized. The system would work, but it would function below the optimum efficiency. When excess acid is used, some of the diamine would be converted to dicationic form RH$_2$N$^+$(PO)$_n$-(EO)$_m$CR'HCH$_2$—NH$_3^+$, which is a less effective hydrate inhibitor. Alternatively, the polyetheramine can be present in an amount ranging from about 0.4 wt. % to about 0.6 wt. % of the fluid mixture. In another aspect, the polyetheramine can be present in an amount that is effective at preventing, reducing, and/or eliminating new and existing gas hydrates within the fluid mixture. Effective amounts of polyetheramine will be apparent to those of skill in the art and are to be considered within the scope of the present invention.

Combining polyetheramines (PEA) with acids produces an exothermic reaction. The reaction products, polyetheramine quaternary salts are gas hydrate inhibitors that display strong antiagglomerant properties. The salt may be produced in a water miscible solvent, such as methanol, ethanol, butanol, heavier alcohol, glycol, or any water miscible solvent capable of producing additional heat upon dissolving or mixing the salt solvent solution with water. If the components are introduced directly into a cold gas/water stream, the reaction and subsequent dissolution process can increase the temperature by several degrees; thus, it would prevent hydrates formation by changing thermodynamic conditions.

Heat is generated in the reaction between the polyetheramine and the acid. In an aspect, the temperature can rise up to about 16° C. in the fluid mixture. In an aspect, the resulting polyetherammonium compound can be reacted with water to further increase the temperature of the fluid mixture.

As another embodiment of the present invention, another method of inhibiting the formation, growth, and/or maintenance of gas hydrates in a fluid mixture is provided. In this embodiment, a polyetheramine and an acid are mixed in the fluid mixture to produce a polyetherammonium compound in situ that interferes with the formation, growth, and/or maintenance of gas hydrates in the fluid mixture and increases a temperature in the fluid mixture. The resulting polyetherammonium compound has a formula as follows:

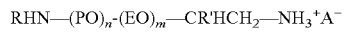

wherein PO=propylene oxide, n=0-10, EO=ethylene oxide, m=0-10, R=$H_2N$—$(PO)_n$-$(EO)_m$—$CH_2CH_2$—, and R'=H or $CH_3$, and A=Cl, Br, I, $SO_4$, OH, $R^2SO_3$, $R^2COO$, HCOO, or $CH_3COO$, wherein $R^2$=an organic radical.

The A is the anionic portion of the polyetherammonium compound is only limited by the type of acid that is selected to produce the polyetherammonium compound. In an aspect, A can be Cl, Br, I, $SO_4$, OH, or $CH_3COO$. Other suitable compounds for A can be used, as will be apparent by those of skill in the art, and are to be considered within the scope of the present invention.

In this embodiment, the polyetherammonium compound is produced in situ, not prior to being added to the fluid mixture. The heat that is generated by preparing the polyetherammonium compound in situ from the polyetheramine and the acid is used to prevent, reduce, stop, and/or eliminate new and existing gas hydrates within the fluid mixture.

Besides the method embodiments, well service compositions are also provided as embodiments of the present invention. In an aspect, the well service composition generates heat in situ as a result of the components reacting so that gas hydrates are prevented, reduced, and/or eliminated. The composition includes a fluid mixture that contains a gas hydrate inhibitor comprising a polyetheramine and an acid. As with other embodiments of the present invention, the polyetheramine has a formula as follows:

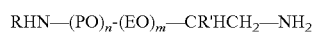

wherein PO=propylene oxide, n=0-10, EO=ethylene oxide, m=0-10, R=$H_2N$—$(PO)_n$-$(EO)_m$—$CH_2CH_2$—, and R'=H or $CH_3$. The polyetheramine and the acid exothermically react so that a polyetherammonium compound is produced in situ that interferes with the formation, growth, maintenance, or combinations thereof of gas hydrates in the fluid mixture and results in an increase in temperature in the fluid mixture. In an aspect, the polyetheramine is present in an amount of about 0.1 wt. % to about 2 wt. % of the fluid mixture and the acid is present in an equimolar amount to the polyetheramine.

As used herein, "polyetheramines" refer to at least polyoxyalkyleneamines containing primary amino groups attached to the terminus of a polyether backbone. In an aspect, the polyetheramine has a molecular weight that is 1000 g/mol or less; or alternatively, 600 g/mol or less. In an aspect, the polyetheramine is diethyleneglycoldiamine; polyoxyalkylenediamines; polyoxypropylene diamines; poly(ethylene oxide capped oxypropylene)etherdiamines; propylene oxide-based triamines; triethyleneglycoldiamines; or combinations thereof. Suitable polyetheramines include, but are not limited to, diethyleneglycoldiamine; polyoxyalkylenediamines such as, polytetramethylene etherdiamines, polyoxypropylenetriamine, and polyoxypropylene diamines; poly(ethylene oxide capped oxypropylene)etherdiamines; propylene oxide-based triamines; triethyleneglycoldiamines; or combinations thereof. Suitable commercially available polyetheramines include Jeffamines® amines EDR-148, D-230, D-400, C-346, ED-600, T-403, XTJ-501, XTJ-511, XTJ-512, and XTJ-525; and Jeffcat® amines ZF-20 and E-40, all of which are manufactured by Huntsman Corporation. Other suitable polyetheramines include D-230 and D-400 amines manufactured by BASF. Other suitable polyetheramines will be apparent to those of skill in the art and are to be considered within the scope of the present invention.

For the acid component of the methods and compositions of the present invention, any acid that exothermically reacts with amines can be used in the present invention, as long as it is compatible with other components within the compositions and methods in which they are used. Suitable acids useful in the present invention include organic acids, mineral acids, or combinations thereof. Suitable organic acids can include carboxylic acid, branched dodecylbenzene sulfonic acid (DDBSA), linear dodecylbenzene sulfonic acid (DDBSA), and the like. Suitable carboxylic acids can include acetic acid, propionic acid, and the like. Suitable mineral acids can include hydrochloric acid and the like. Other suitable acids will be apparent to those of skill in the art and are to be considered within the scope of the present invention.

In an aspect, the composition and methods of the invention can also include polymeric kinetic gas hydrate inhibitors that are combined with the gas hydrate inhibitors of the present invention. Suitable kinetic gas hydrate inhibitors that can be combined with the gas hydrate inhibitor of the present invention can include polyvinylpyrrolidone (PVP), polyvinylcaprolactam (PVCap), or a polyvinylpyrrolidone caprolactam dimethylaminoethylmethacrylate copolymer, such as "VC 713," which is commercially available from International Specialty Products (ISP) of Wayne, N.J. In another aspect, the kinetic gas hydrate inhibitor comprises polyvinylcaprolactam. Other suitable kinetic gas hydrate inhibitors will be apparent to those of skill in the art and are to be considered within the scope of the present invention.

Combining of the polyetheramine and the acid into the fluid mixture can be aided by mechanical means known in the art, including but not limited to static in-line mixers on a pipeline or an atomizing injection. In most pipeline transportation applications, however, sufficient mixture and contacting will occur due to the turbulent nature of the fluid flow, which may make mechanical mixing aids unnecessary.

The present invention is useful in any fluid mixture wherein gas hydrates can form, and finds particular utility in the control of gas hydrate formation that may occur during the extraction of natural gas and petroleum fluids, such as low boiling hydrocarbons, from a producing well, during transportation of such gas and fluids, and during processing of such gas and fluids. The invention is particularly useful in controlling the formation of gas hydrates in fluid mixtures that comprise a gaseous phase and a liquid phase, the gaseous phase being a low boiling hydrocarbon such as a hydrocarbon containing from about 1 to 4 carbon atoms such as methane, ethane, propane, and butane. The invention can also be used to dissolve existing gas hydrates in the fluid mixtures. The liquid phase comprises a mixture of water and liquid hydrocarbons of from about 3 to 8 carbon atoms such as propane, butanes, pentanes, hexanes, heptanes, octanes, and small amounts of heavier hydrocarbons referred to as $C_9+$. Thus, the invention relates to methods for inhibiting the formation, growth, and/or agglomeration of gas hydrate crystals in a mixture containing low boiling hydrocarbons in water. The invention also relates to methods of dissolving existing gas hydrate crystals that may already be present in the mixture containing low boiling hydrocarbons in water.

The methods and compositions described herein can be used in various applications. In an aspect, the methods and compositions of the present invention can be used in applications where the fluid mixture is contained within a producing well, a pipeline, a refinery process stream, a storage facility, a formation, or combinations thereof. Other applications that could benefit from the use of the methods and compositions of the present invention will be apparent to those of skill in the art and are to be considered within the scope of the present invention.

The fluid mixtures that can be treated in accordance with the methods of the present invention include any fluid or fluids comprising water and guest molecules, where water and guest molecules together can form clathrate hydrates. The fluid mixture can comprise any combination of one or more gaseous phase, aqueous liquid phase, and organic liquid phase, and in any and all proportions. Typically, the fluid mixture will comprise at least two fluid phases—a gaseous phase, which comprises guest molecules, and an aqueous liquid phase. Generally, a suitable fluid mixture will comprise an organic liquid phase as well as a gaseous phase and an aqueous liquid phase.

The polyetheramine and acid can be added to the fluid mixture in a variety of ways known in the art so that the reaction product of the polyetheramine and the acid, the polyetherammonium compound is sufficiently incorporated into the fluid mixture to control the hydrate formation. For example, the polyetheramine and acid can be injected into a downhole location in a producing well to control hydrate formation in fluids being produced through the well. Likewise, the polyetheramine and acid can be injected into the produced fluid stream at a wellhead location, or even into piping extending through a riser, through which produced fluids are transported in offshore producing operations from the ocean floor to the offshore producing facility located at or above the surface of the water. Additionally, the polyetheramine and acid can be injected into a fluid mixture prior to the transportation of the fluid mixture, such as via a subsea pipeline from an offshore producing location to an onshore gathering and/or processing facility. Other suitable ways to add the polyetheramine and acid to the fluid mixture will be apparent to those of skill in the art and are to be considered within the scope of the present invention.

Figure 2:
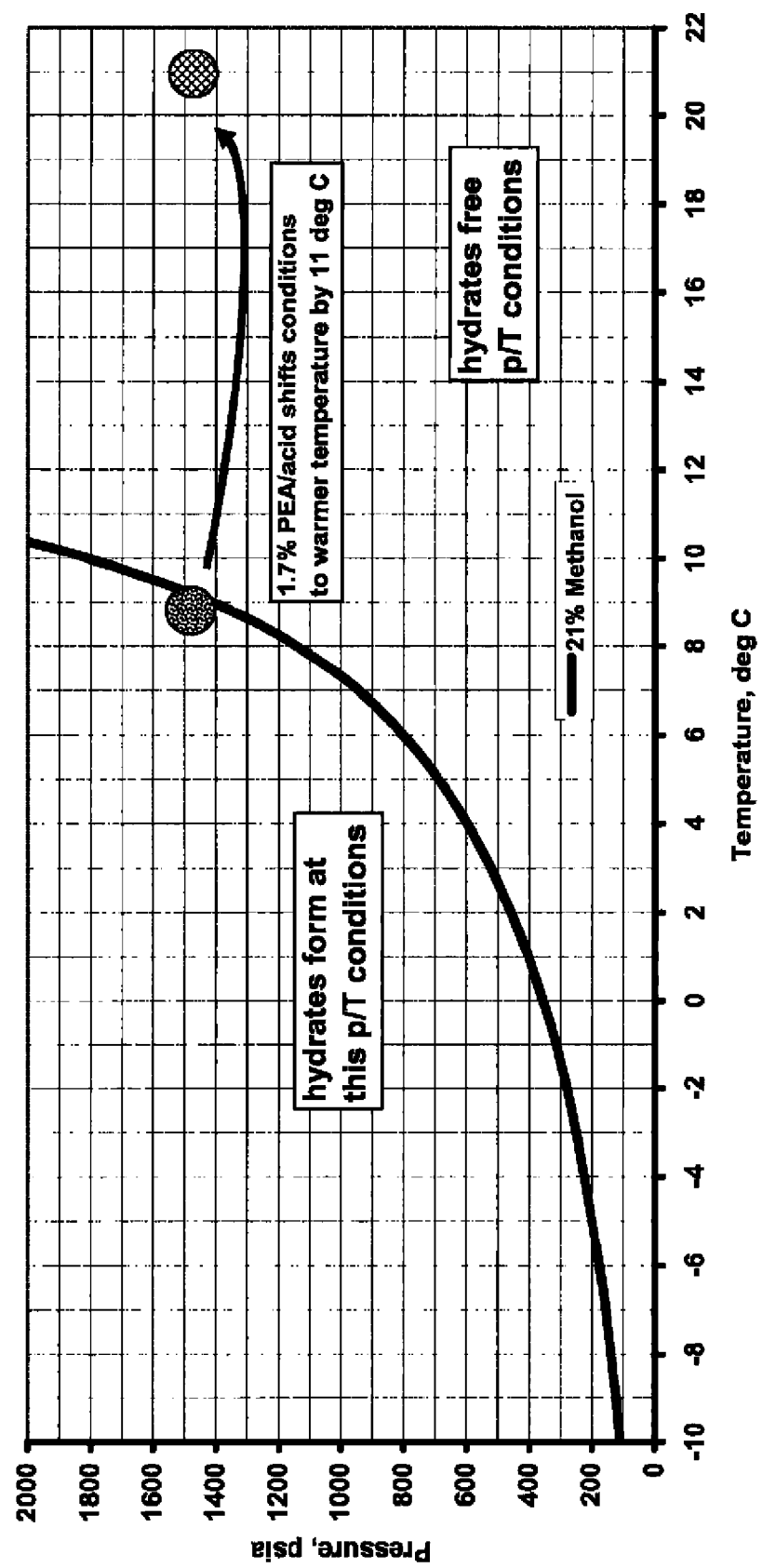
FIG. 2 is a chart illustrating the thermodynamic effect on the water/test gas of adding the gas hydrate inhibitor to the test streams in accordance with embodiments of the present invention.

As an advantage of the present invention, lower concentrations of the gas hydrate inhibitor can be used when compared with prior art inhibitors. As indicated previously, methanol is added in an amount that ranges between 20% and 40% of the water volume of a given fluid mixture system. The gas hydrate inhibitors of the present application are generally effective in amounts of from about $\frac{1}{5}$ to about $\frac{1}{1000}$ of the methanol required to treat a given fluid mixture system. To demonstrate the amount of methanol needed to inhibit the formation of gas hydrates, a calculated equilibrium curve for a test gas with no gas hydrate inhibitor is shown in FIG. 1. If, for example, the gas/water system being at hydrate equilibrium pressure and temperature conditions 1400 psi @ 20° C. was cooled to new pressure and temperature conditions 1400 psi @ 9° C. a subcooling condition of 11° C. ($\Delta T=11°$ C.) would be achieved. The subcooling temperature, $\Delta T$, is defined as a difference between the actual gas/water temperature and the hydrate equilibrium temperature at the same pressure. At $\Delta T=11°$ C., the mixture would produce hydrates. When 21 wt. % (25 vol. %) methanol is added to the test gas, the equilibrium curve is shifted and operates at about 11° C. lower than the original equilibrium curve at the same pressure, as shown in FIG. 1. Arbitrarily selected point 1400 psi @ 20° C. is moved by 11° C. to 1400 psi @ 9° C. after 100% water phase became 25 vol. % methanol solution in water. Effectively, the entire equilibrium curve was moved by about 11° C. toward an otherwise hydrate-generating region as shown on FIG. 2. The exact subcooling shift depends of the actual pressure and would be more than 12° C. for pressures above 2000 psi and less than 10° C. below 300 psi. By contrast, in FIG. 2, if 1.7 wt. % of the gas hydrate inhibitor of the present invention is used, the test fluid is warmed by 12° C. Both gas hydrate inhibitors, methanol and PEA/acid, have the same thermodynamic effect on the test fluid, but the gas hydrate inhibitor of the present invention did so by only using about 8% of the quantity of the methanol that was needed to achieve comparable results. As an added benefit of the present invention, the gas hydrate inhibitors of the present invention dissolve any existing gas hydrates that are present in the fluid mixture. Kinetic polymeric hydrate inhibitors of the prior art do not dissolve existing hydrates.

EXAMPLES

The following examples are included to demonstrate the use of compositions in accordance with embodiments of the present invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the scope of the invention.

Example 1

Thermal Effect of Reacting Polyetheramines with Acids

A methanol solution of a polyetheramine having a molecular weight of 320 (0.02 M in 158 g solvent) was treated in a calorimeter with an equimolar amount of dodecylbenzenesulfonic acid (DDBSA, 6.52 g). Upon reaction, the temperature of solution increased by 7° C. Next, 210 g of water (at 20° C.) was added to the salt solution and the temperature increased another 5° C. The total measured heat output of the process was 72 kJ/kg for the polyetheramine in methanol solution.

Similar experiments were conducted using glacial acetic acid or hydrochloric acid (37%) as amine neutralizing agents. In these experiments the produced salt solution was mixed with a larger volume of water, 20:80 ratio. In both cases the total measured heat output was 150 kJ/kg.

TABLE 1

Heat Generated from 0.02M Polyetheramine Neutralized and Dissolved in Water

| Experiment # | Acid | Water/salt ratio | Generated heat kJ/kg |
|---|---|---|---|
| 1 | DDBSA 6.52 g | 100:80 | 72 |
| 2 | CH$_3$COOH (gl.) 1.2 g | 100:25 | 150 |
| 3 | HCl (37%) 2.0 g | 100:25 | 150 |

Example 2

Gas Hydrate Inhibition Properties of Neutralized Polyetheramines

Figure 3:
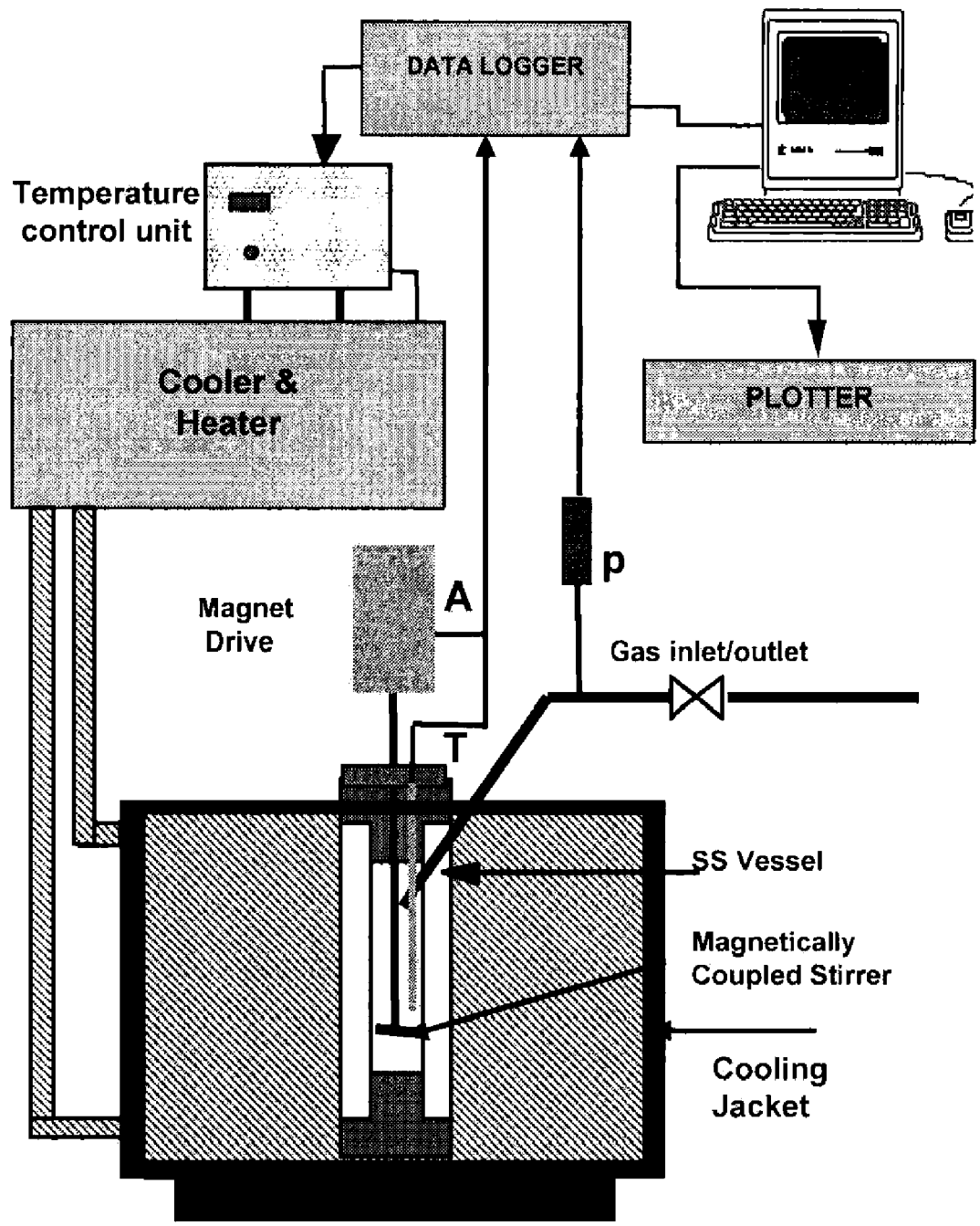
FIG. 3 is a schematic representation of the testing apparatus used in the Examples.

The testing was done in an autoclave type apparatus (FIG. 3) on Green Canyon gas mixture. Field condensate was added to each experiment. Gas and condensate compositions are provided in Table 2 for the Green Canyon gas mixture. Each test was performed at 2° C. (35.6° F.) and 760 to 1000 psi (52.4 to 68.95 bar) using 200 ml of test water solution and 20 ml of condensate. The approximate molar ratio of water to gas to condensate was 11:1:0.15.

TABLE 2

| Gas and Condensate Composition, Mole % | | |
|---|---|---|
| Component | Green Canyon Gas | Condensate |
| Nitrogen | 0.4 | |
| Carbon Dioxide | 0 | |
| Methane | 87.2 | |
| Ethane | 7.6 | |
| Propane | 3.1 | |
| i-Butane | 0.5 | |
| n-Butane | 0.8 | |
| i-Pentane | 0.2 | |
| n-Pentane | 0.2 | |
| C-5 | | 8.15 |
| C-6 | | 16.8 |
| C-7 | | 30.77 |
| C-8 | | 17.11 |
| C-9 | | 10.09 |
| C-10 | | 5.68 |
| C-11 | | 4.08 |
| C-12 | | 3.18 |
| C-13 | | 2.22 |
| C-14 | | 1.25 |
| C-15 | | 0.70 |
| C-16 | | 0.20 |
| C-17+ | | 0.49 |

Testing Kinetic Hydrate Inhibitors involves fast cooling the cell to desired p/T conditions and continuous stirring at the temperature to the point of 10% gas to hydrate conversion. After the completion of each test, the cell is warmed up to 30° C. for 5 hours, the old solution is drained and the cell is flushed with a hot (~50° C.) solution of the next system to be tested, which is also drained. Finally, the fresh test solution is added to the cell, which is then pressurized with a test gas and the cooling is activated. This cell loading procedure is performed to protect the experiment integrity by removing any hydrate residues from the previous test, which eliminates the water "memory" effect that causes accelerated hydrate formation in water/gas systems going through hydrates/warm up cycles. In a product development process, testing conditions are generally selected to test the product limitations. Subcooling temperature of testing $\Delta T=14°$ C. to $16°$ C. (25.2° F. to 28.8° F.) and low concentration of the inhibitor 2-4% are a lot more demanding than typical field applications.

Subcooling temperature is defined as a difference between a thermodynamic hydrate/no hydrate equilibrium temperature and the actual experiment temperature. For the Green Canyon gas, the equilibrium temperatures at test pressures 1000 psi, 850 psi, and 760 psi are 18° C., 17° C., and 16° C. respectively. The testing at these pressures was always conducted at 2° C.; hence the $\Delta T$ temperatures of 14° C. to 16° C. The averaged results from three identical experiments are collected in Tables 3, 4 and graphically depicted in FIGS. 4-6.

Table 3 shows the time that is needed for various amounts of gas to hydrate conversion at $\Delta T=14°$ C. using a polyetheramine that was neutralized with dodecylbenzenosulfonic acid (DDBSA) and acetic acid ($CH_3COOH$). The polyetheramine and acid were in a methanol solvent, so that the concentration of the polyetheramine/acid/methanol concentration was 4 wt. % in the water phase. An uninhibited system was observed for comparison purposes. As can be seen in Table 3, the systems using the inhibitor compositions in accordance with the present invention take substantially longer to form hydrates than in the systems without the gas hydrate inhibitor of the present invention.

TABLE 3

| | | Neutralizing acid, subcooling ($\Delta T$) 14° C. | |
|---|---|---|---|
| Gas to hydrate conversion, % | No inhibitor, Hours | DDBSA, 4%, hours | $CH_3COOH$, 4%, hours |
| 0 | 4.9 | 34.3 | 16.7 |
| 1 | 5.9 | 34.9 | 17.7 |
| 2 | 6.7 | 35.1 | 18.4 |
| 3 | 7.1 | 35.2 | 19.3 |
| 4 | 7.4 | 35.3 | 20.8 |
| 5 | 7.7 | 35.4 | 23.2 |
| 7 | 9.1 | 35.6 | 25.6 |
| 10 | 10.7 | 35.8 | 33.3 |

Table 4 shows the difference that the concentration of the polyetheramine and hydrochloric acid gas hydrate inhibitor has on the time that it takes for particular gas to hydrate conversion rates. As can be seen in Table 4 with $\Delta T=15°$ C., it takes longer to form hydrates using 4 wt. % concentration than when using 2 wt. % concentration.

TABLE 4

| | | Neutralizing acid HCl, subcooling ($\Delta T$) 15° C. | |
|---|---|---|---|
| Gas to hydrate conversion, % | No inhibitor, $\Delta T$ 15° C., hours | $\Delta T$ 15° C., 2%, h | $\Delta T$ 15° C., 4%, h |
| 0 | 5.8 | 111.7 | 135 |
| 1 | 6.3 | 113.2 | 135.6 |
| 2 | 6.6 | 113.5 | 136.2 |
| 3 | 6.9 | 113.8 | 136.7 |
| 4 | 7.3 | 114.2 | 137 |
| 5 | 7.8 | 114.6 | 137.3 |
| 7 | 8.6 | 115.4 | 137.7 |
| 10 | 9.6 | 116.5 | 138.4 |

Table 5 shows the effect of changing the subcooling condition that is taking place using 4 wt. % hydrochloric acid with the polyetheramine. As shown in Table 5, gas hydrates form faster at $\Delta T$ 16° C. subcooling when compared with $\Delta T$ 15° C.

TABLE 5

| | | Neutralizing acid 4% HCl, subcooling ($\Delta T$) 15-16° C. | |
|---|---|---|---|
| Gas to hydrate conversion, % | No inhibitor, $\Delta T$ 15° C., hours | $\Delta T$ 15° C. | $\Delta T$ 16° C. |
| 0 | 5.8 h | 135 | 74.5 |
| 1 | 6.3 h | 135.6 | 78.4 |
| 2 | 6.6 | 136.2 | 79.6 |
| 3 | 6.9 | 136.7 | 80 |
| 4 | 7.3 | 137.0 | 80.7 |
| 5 | 7.8 | 137.3 | 81.1 |
| 7 | 8.6 | 137.7 | 81.6 |
| 10 | 9.6 | 138.4 | 82.3 |

Figure 4:
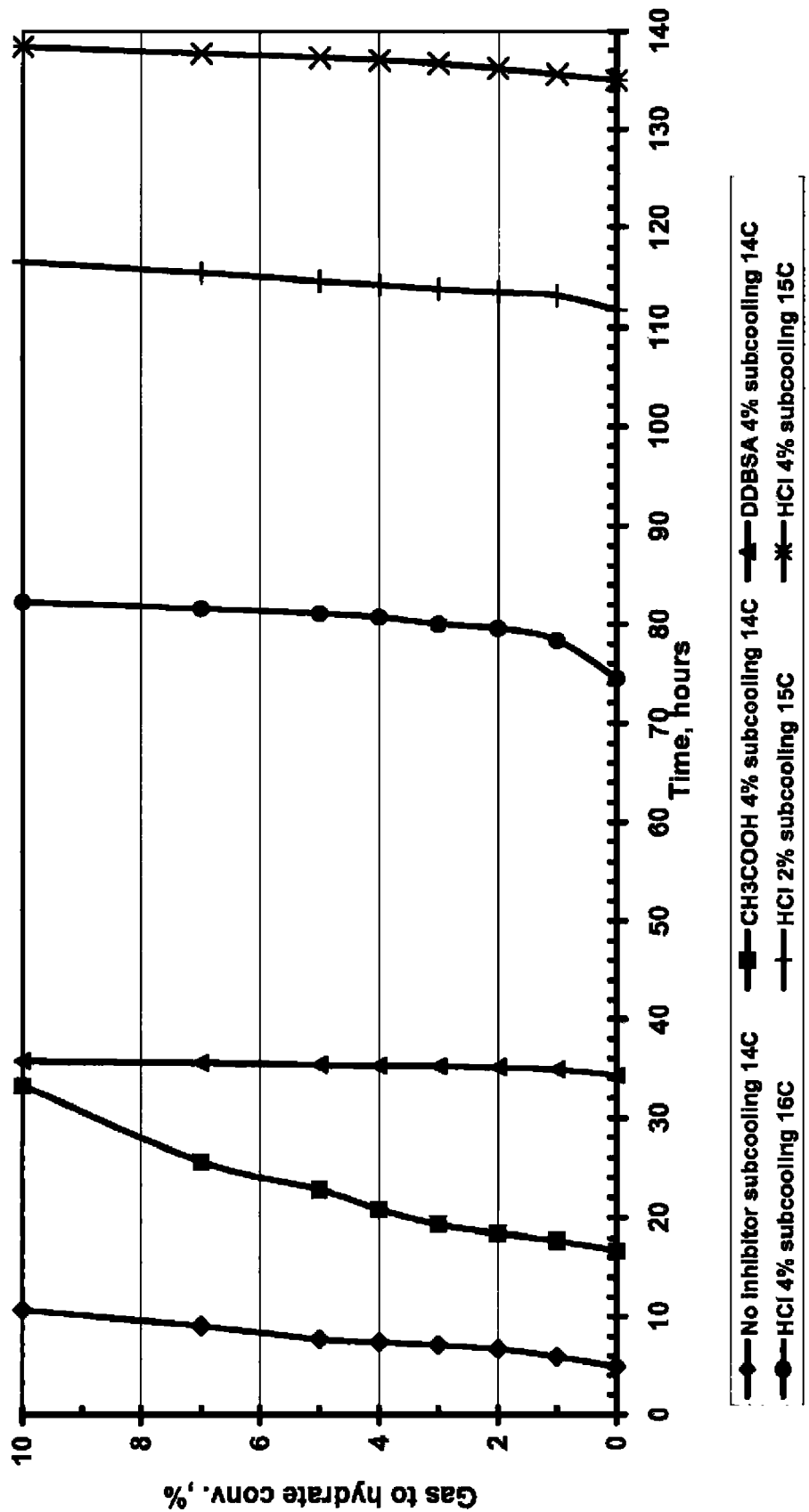
FIG. 4 is a summary chart showing the gas to hydrate conversion rates for water and gas systems not treated with and treated with polyetheramines neutralized with various acids in accordance with embodiments of the present invention.

The results shown in Tables 3-5 indicate that gas hydrate inhibitors comprising polyetheramine and an acid are strong hydrate inhibitors. The combined results for the polyetheramine and acid combinations described in this Example 2 are shown in FIG. 4. The thermal effect of neutralization is eliminated. The effect shows in the initial water/inhibitor contact by warming up the system and lowering the ΔT value. When the heat is dissipated to the environment, the effect disappears and normal kinetic inhibition keeps the system hydrate-free.

Figure 5:
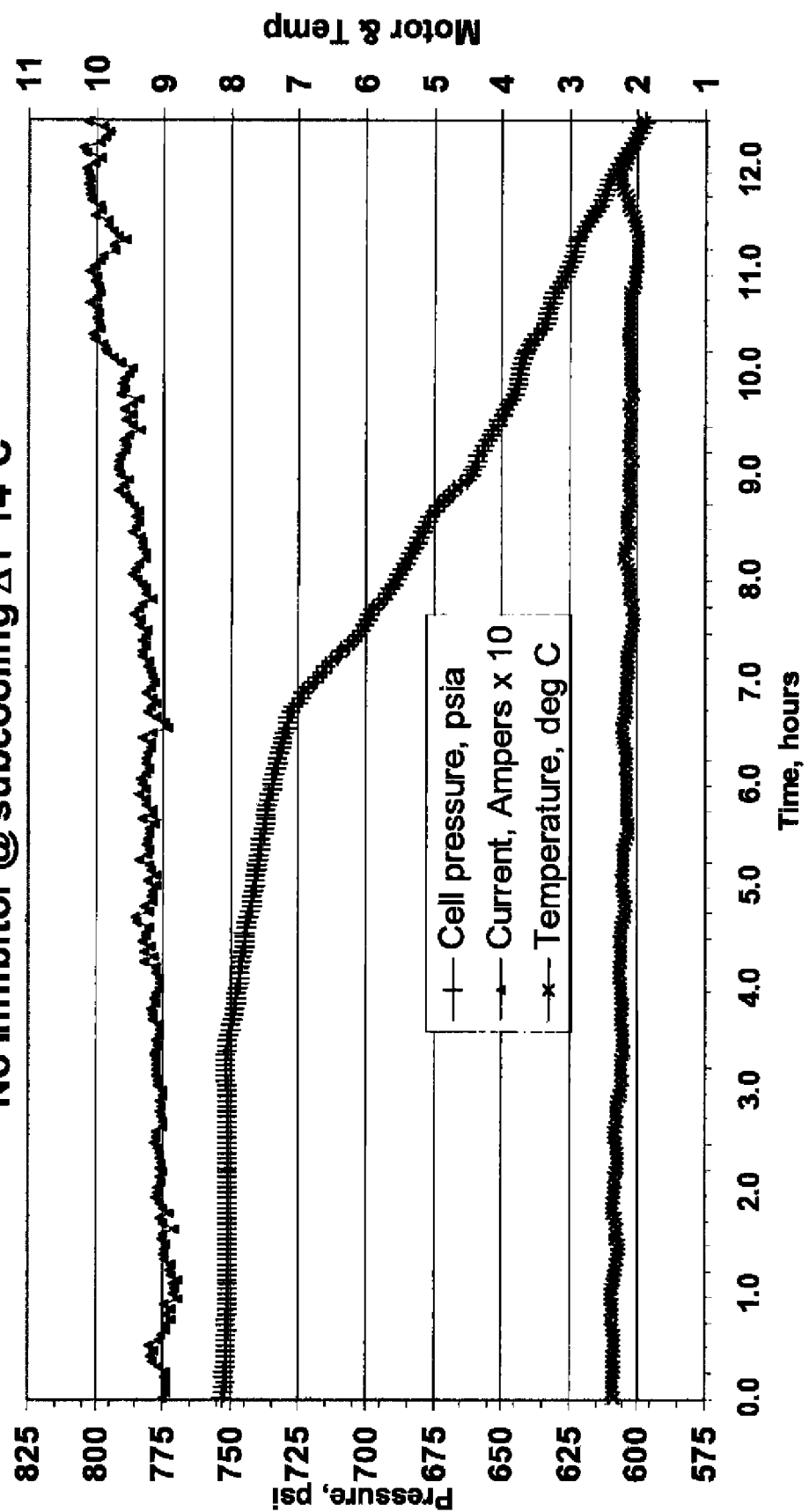
FIG. 5 is a time scale chart showing the temperature, pressure, and electrical current used in prior art systems having no gas hydrate inhibitors.
Figure 6:
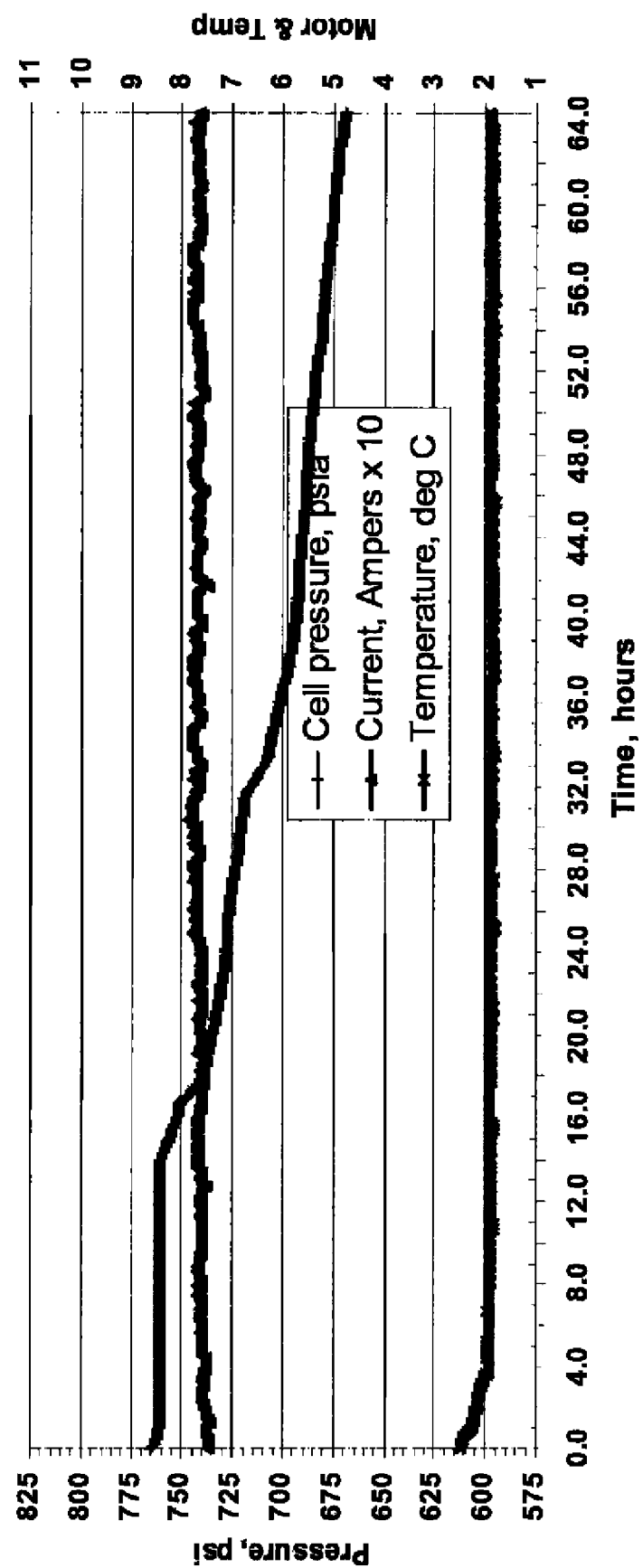
FIG. 6 is a time scale chart showing the temperature, pressure, and electrical current used in hydrate experiments using gas hydrate inhibitors made in accordance with an embodiment of the present invention.

As another benefit of the present invention, less electrical current is needed to maintain the stirrer speed for the fluid mixture. As shown in FIG. 5, as the hydrate formation increases, solids accumulate in the vessel in which the fluid mixture is typically contained and stirred at a constant speed of 250 rpm causing an increase in the electrical current that is required to operate the stirrer. When the gas hydrate inhibitor of the present invention is used, less current is needed to operate the stirrer, as shown in FIG. 6 than without the gas hydrate inhibitor (FIG. 5). The gas hydrate inhibitor of the present invention demonstrates some anti-agglomerate properties.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the methods described herein without departing from the concept, spirit and scope of the invention. More specifically, it will be apparent that certain agents that are chemically related can be substituted for the agents described herein while the same or similar results would be achieved. All such similar substitutes and modifications apparent to those skilled in the art are deemed to be within the scope and concept of the invention.

What is claimed is:

1. A method of inhibiting the formation, growth, maintenance, or combinations thereof of gas hydrates in a fluid mixture comprising a gaseous phase and a liquid phase, the method comprising:
   (a) combining a polyetheramine and an acid with the fluid mixture, the polyetheramine having a formula:

RHN—(PO)$_n$-(EO)$_m$—CR'HCH$_2$—NH$_2$ wherein PO=propylene oxide,
   n=0-10,
   EO=ethylene oxide,
   m=0-10,
   R=—H or H$_2$N—(PO)$_n$-(EO)$_m$—CH$_2$CH$_2$—,
   R'=H or CH$_3$ and
   m+n is greater than or equal to 1;
   (b) producing a polyetherammonium compound in the fluid mixture from the exothermic reaction of the polyetheramine and the acid; and
   (c) inhibiting the formation, growth, maintenance or combination thereof of gas hydrates in the fluid mixture from the heat generated during the exothermic reaction and the produced polyetherammonium compound.

2. The method of claim 1, wherein step (b) further comprises increasing the temperature of the fluid mixture with the polyetherammonium compound and water.

3. The method of claim 1, wherein the polyetheramine is present in an amount ranging from about 0.1 wt. % to about 2 wt. % of the fluid mixture and the acid is present in an equimolar amount to the polyetheramine.

4. The method of claim 1, wherein the fluid mixture in step (b) has a rise in temperature of up to about 16° C.

5. The method of claim 1, wherein the heat generated during the exothermic reaction and the polyetherammonium compound that is produced in situ in step (b) at least partially dissolves existing gas hydrates in the fluid mixture.

6. The method of claim 1, wherein the fluid mixture is contained within a producing well, a pipeline, a refinery process stream, a storage facility, a formation, or combinations thereof.

7. The method of claim 1, further comprising adding a kinetic gas hydrate inhibitor to the polyetheramine and the acid in step (a).

8. A method of inhibiting the formation, growth, maintenance, or combinations thereof of gas hydrates in a fluid mixture comprising a gaseous phase and a liquid phase, the method comprising:
   (a) exothermally reacting a polyetheramine and an acid in the fluid mixture and producing in situ in the fluid a polyetherammonium compound, wherein the polyetherammonium compound and the heat generated from the exothermic reaction increases the temperature of the fluid mixture and further wherein the polyetherammonium compound is produced in a water miscible solvent; and
   (b) inhibiting the formation, growth, maintenance, or combinations thereof of gas hydrates in the fluid mixture with the polyetherammonium compound and the heat generated from the exothermic reaction
   wherein the polyetherammonium compound is of the formula:

RHN—(PO)$_n$-(EO)$_m$—CR'HCH$_2$—NH$_3^+$A$^-$ wherein PO=propylene oxide,
   n=0-10,
   EO=ethylene oxide,
   m=0-10,
   m+n is greater than or equal to 1,
   R=—H or H$_2$N—(PO)$_n$-(EO)$_m$—CH$_2$CH$_2$—,
   R'=H or CH$_3$, and
   A=Cl, Br, I, SO$_4$, OH, or CH$_3$COO.

9. The method of claim 8, further comprising increasing the temperature of the fluid mixture in step (a) with the polyetherammonium compound and water.

10. The method of claim 8, wherein the polyetheramine is present in an amount ranging from about 0.1 wt. % to about 2 wt. % of the fluid mixture and the acid is present in an equimolar amount to the polyetheramine.

11. The method of claim 8, wherein the acid is an organic acid, a mineral acid, or combinations thereof.

12. The method of claim 8, wherein the fluid mixture has a rise in temperature in step (a) of up to about 16° C.

13. The method of claim 8, wherein the polyetherammonium compound that is produced in situ and the heat generated from the exothermic reaction at least partially dissolves existing gas hydrates in the fluid mixture.

14. The method of claim 8, wherein the fluid mixture is contained within a producing well, a pipeline, a refinery process stream, a storage facility, a formation, or combinations thereof.

15. The method of claim 8, further comprising adding a kinetic gas hydrate inhibitor to the polyetheramine and the acid in step (a).

16. The method of claim 8, wherein the water miscible solvent is methanol, ethanol, butanol or a glycol.

17. A method of inhibiting the formation, growth, maintenance, or combinations thereof of gas hydrates in a fluid mixture in a producing well, pipeline, refinery process stream, storage facility, a formation or a combination thereof comprising:

(a) reacting in the producing well, pipeline, refinery, process stream, storage facility, formation or combination thereof a polyetheramine and an acid in a fluid mixture to produce in situ a polyetherammonium compound in the well, pipeline, refinery, process stream, storage facility, formation or combination thereof, wherein the reaction of the polyetheramine and acid is exothermic and further wherein the fluid mixture comprises a gaseous phase and a liquid phase; and (b) inhibiting the formation, growth, maintenance, or combinations thereof of gas hydrates in the fluid mixture with the polyetherammonium compound and the heat generated from the exothermic reaction wherein the polyetherammonium compound is of the formula:

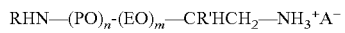

wherein PO=propylene oxide,
n=0-10,
EO=ethylene oxide,
m=0-10,
m+n is greater than or equal to 1,
R=H or $H_2N$—$(PO)_n$-$(EO)_m$—$CH_2CH_2$—,
R'=H or $CH_3$, and
A=Cl, Br, I, $SO_4$, OH, or $CH_3COO$.

18. The method of claim 17, wherein the polyetheramine is diethyleneglycoldiamine; polyoxyalkylenediamines; polyoxypropylene diamines; poly(ethylene oxide capped oxypropylene)etherdiamines; propylene oxide-based triamines; triethyleneglycoldiamines; or combinations thereof and the acid is an organic acid, a mineral acid, or combinations thereof.

19. The method of claim 17, wherein step (a) further comprises increasing the temperature of the fluid mixture with the polyetherammonium compound and water.

20. The method of claim 17, further comprising adding a kinetic gas hydrate inhibitor to the polyetheramine and the acid in step (a).

* * * * *